(12) United States Patent
Evans

(10) Patent No.: US 6,928,056 B2
(45) Date of Patent: Aug. 9, 2005

(54) SYSTEM AND METHOD FOR DISTRIBUTION OF A DATA STREAM FROM HIGH-TO-LOW-TO-HIGH BANDWIDTH LINKS

(75) Inventor: David J. Evans, Petaluma, CA (US)

(73) Assignee: Nokia Networks Oy, Espoo (FI)

( * ) Notice: Subject to any disclaimer, the term of this patent is extended or adjusted under 35 U.S.C. 154(b) by 690 days.

(21) Appl. No.: 09/752,089

(22) Filed: Dec. 29, 2000

(65) Prior Publication Data

US 2002/0122439 A1 Sep. 5, 2002

(51) Int. Cl.[7] .............................................. G01R 31/08
(52) U.S. Cl. ...................... 370/244; 370/394; 370/474
(58) Field of Search ...................... 714/1, 48; 370/235, 370/236.1, 236.2, 242, 243, 249, 389, 394, 395.1, 474, 534, 535, 536

(56) References Cited

U.S. PATENT DOCUMENTS

| | | | | |
|---|---|---|---|---|
| 5,608,733 A | * | 3/1997 | Vallee et al. | 370/394 |
| 5,617,417 A | * | 4/1997 | Sathe et al. | 370/394 |
| 5,875,192 A | * | 2/1999 | Cam et al. | 370/395.7 |
| 6,205,142 B1 | * | 3/2001 | Vallee | 370/394 |
| 6,222,858 B1 | * | 4/2001 | Counterman | 370/474 |
| 6,574,191 B1 | * | 6/2003 | Usukura et al. | 370/216 |
| 6,621,794 B1 | * | 9/2003 | Heikkinen et al. | 370/235 |
| 6,680,954 B1 | * | 1/2004 | Cam et al. | 370/474 |
| 6,717,960 B1 | * | 4/2004 | Anesko et al. | 370/536 |

* cited by examiner

Primary Examiner—Bob A. Phunkulh
(74) Attorney, Agent, or Firm—Squire, Sanders & Dempsey L.L.P.

(57) ABSTRACT

A system and method are provided for identifying an error condition and the sequence of a high bandwidth data stream that is split among low bandwidth links. The system includes a first unit coupled to links for inverse multiplexing a data stream into frames that are transmitted over at least two links and a second unit at the second location coupled to the other end of the links for receiving the frames and multiplexing the frames to produce the cell stream, wherein the first unit inserts at least one detection cell into each frame prior to transmission and the second unit analyzes the detection cell to determine if an error condition exits. The method includes establishing a size for a detection cell and a frequency of insertion into the data stream, determining a known signal that will be part of the detection cell, inserting the detection cell into the data stream, and analyzing the received detection cell at the second unit to determine if an error condition exists.

3 Claims, 4 Drawing Sheets

SYSTEM AND METHOD FOR DISTRIBUTION OF A DATA STREAM FROM HIGH-TO-LOW-TO-HIGH BANDWIDTH LINKS

BACKGROUND

This invention relates to telecommunication systems and, more specifically, to transporting data streams over physical links of varying bandwidth.

In telecommunication networks or systems, data is transported from one location in the network to another location in the network at various data rates. Thus, the situation may arise, at some point in the network, where the transport or data rate for an incoming data stream exceeds the capacity of a single physical link over which the data streams needs to be transported. Data streams that exceeds the capacity of a single physical link can be split into separate streams and the separate streams sent over multiple physical links; the aggregate capacity of the lower capacity lines is sufficient to carry the data stream. This approach to splitting the data or transporting a data stream over several lines is known as "inverse multiplexing".

One type of link is a T1 link. T1 is a full-duplex system: transmitted signals are transported on one wire pair, and received signals are transported on a separate wire pair a rate of 1.544 Mbps.

As an alternative to T1 links and equipment, links can have an E1 bit streams that are transmitted at a line rate of 2.048 Mbps.

In order to transport data, the data is packaged according to a predetermined protocol. One protocol is Asynchronous Transfer Mode (ATM). In accordance with ATM protocol, the data is packaged in cells called ATM cells. In inverse multiplexing, the ATM data or cell stream is divided into frames and transported over several low capacity lines, such as the T1 links.

One application of inverse multiplexing a high rate data stream onto a low rate data line is in systems that transport ATM cells. A typical ATM cell is 53 bytes in length. Each cell includes a payload and a header. The equipment processing the ATM cell stream may insert or delete idle ATM cells into or from, respectively, each frame. A frame includes ATM cells, control protocol cells for inverse multiplexed ATM (ICP), and/or filler cells.

Once the separate streams have passed through the low capacity portion of the network, they can be combined to form the original data stream. Known systems and methods combine or multiplex the separate data streams from the lower capacity lines at a receiver and, thereby, reconstruct the original data stream.

In order to reconstruct the original data stream from the individual low capacity data streams that are received at the receiver, the sequencing or ordering of the frames and, thus, the ATM cells must be tracked. Known methods include inserting a cell into the frame, such as the ICP cell that includes sequencing information for each frame, among other information. However, insertion of this cell results in a great deal of overhead because each ICP cell typical includes 53 bytes, of which only 1 byte is typically devoted to frame sequencing information. Additionally, in order to accurately detect if an error condition exists, cyclic redundancy check (CRC) bytes and/or ICP cells of several sequentially received ICP cells are analyzed. Thus, it takes several frames and, hence, many ATM cells pass before current systems realize that an error condition existed and currently exists. Accordingly, the time take to correct or handle the error condition is greatly increased.

Therefore, what is needed is a system and method for identifying an error condition and the sequence of a data stream that is taken from a high bandwidth line and split among low bandwidth links, which have an aggregate bandwidth that is at least equal to the high bandwidth line, with minimal overhead quick recovery from error conditions.

SUMMARY

A system and method are provided for identifying an error condition in a data stream that is split among low bandwidth links while introducing minimal overhead in the data stream and allowing for quick recovery from error conditions. The system includes a first unit at the first location coupled to one end of each of a plurality of links for receiving the cell stream and inverse multiplexing the cell stream into frames that are transmitted over at least two trained links selected from the plurality of links and a second unit at the second location coupled to the other end of each of the links for receiving the frames from each of the trained links and multiplexing the frame to produce the cell stream, wherein the first unit inserts at least one detection cell into each frame prior to transmission and the second unit analyzes the received detection cell to determine if an error condition exits.

The method includes establishing a desired cell size for a detection cell and a frequency of insertion into the data stream, determining a known signal that will be incorporated into the detection cell, inserting the detection cell with the known signal into the data stream being transmitted from the first unit to the second unit, and analyzing the received detection cell at the second unit to determine if an error condition exists.

DETAILED DESCRIPTION

Figure 1:
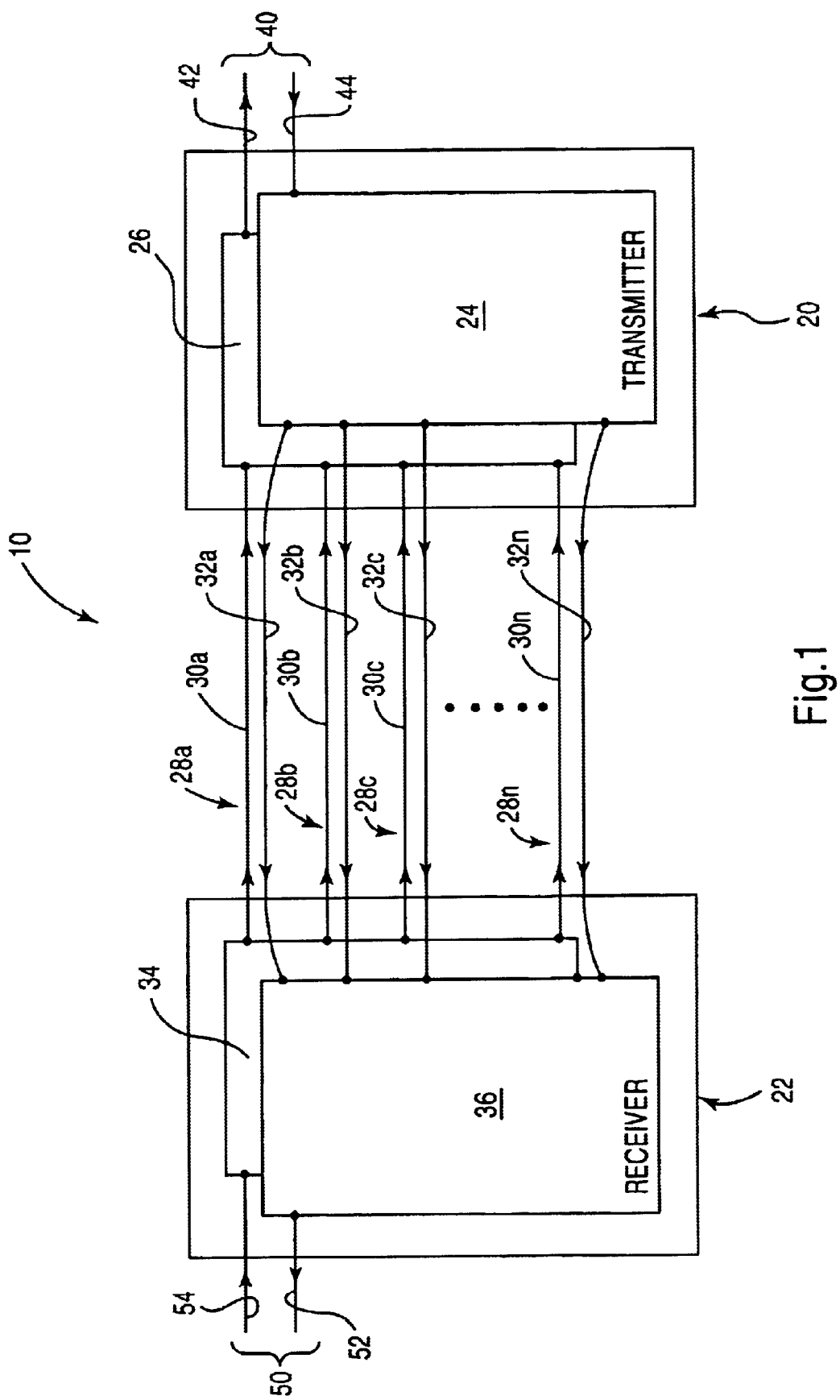
FIG. 1 is a block diagram of two inverse multiplexers (IMUXs) coupled by multiple bi-directional physical communication links for passing ATM cell streams over the links.

Referring now to FIG. 1, a system 10 includes at least two inverse multiplexers (IMUXs) 20 and 22 coupled by multiple physical communication links 28a–n. For illustration purposes, the IMUXs 20 and 22 are shown coupled by the physical communication links 28a–n that are DS1 links, which carry bi-directional format data streams. Each link 28 carries data streams in either direction at a specified rate, which depends on the link's characteristics. In the illustrative example, each of the links 28a–n carries one DS1 data stream 30a–n in one direction and another DS1 data stream 32a–n in the other direction. In other embodiments, data streams of different rates and formats, such as an E1, may be utilized.

Each of the links 28a–n can be a part of or pass through a public switched telephone network (PSTN). Furthermore, the links 28a–n may be physically separate, for instance, using separate conductors in separate cables, or using different paths through the PSTN. Also, links 28a–n may be physically combined for all or part of the path between IMUX 20 and 22. For example, the data streams may be multiplexed onto a higher capacity physical communication link, such as a DS3 link. Additionally, links 28a–n may exhibit different properties, including different transmission delays and different error rates.

The logical structure for the IMUX 20 and 22 can be implemented using a programmable processor, dedicated hardware, or both. A controller may, in some embodiments, be implemented as software processes executing on a programmable processor, under the control of software stored on a medium, such as a semiconductor read-only-memory (ROM). The controller may also include timing or clocking circuitry to determine the timing of data transfers between modules or unit. If the IMUX 20 and/or 22 includes a programmable processor, then software can be distributed to the IMUX 20 and/or 22, for example on a physical removable medium or over a data network.

The IMUX 20 includes a transmitter 24 and a receiver 26. For illustrative purposes, an ATM cell stream is discussed, but any form of data stream can be handled. The transmitter 24 accepts an inbound ATM cell stream 44 over a physical ATM communication link 40. The transmitter 24 of the IMUX 20 inverse multiplexes and sends the ATM cell stream 44 in the form of the DS1 data streams 32a–n over the links 28a–n, respectively, to the IMUX 22.

The IMUX 22 includes a transmitter 34 and the receiver 36. The receiver 36 receives the DS1 data streams 32a–n from the transmitter 24 of the IMUX 20 and multiplexes the DS1 data streams 32a–n. The IMUX 22 can also receive an incoming ATM cell stream and inverse multiplex the incoming ATM cell stream over the links 28a–n. More specifically, the transmitter 34 of the IMUX 22 accepts an inbound ATM cell stream 54 over a physical ATM communication link 50. The transmitter 34 inverse multiplexes the ATM cell stream 54 in the form of DS1 data streams 30a–n over a selected number of the links 28a–n, respectively, that are then received by the receiver 26 of the IMUX 20; the receiver 26 multiplexes the DS1 data streams 30a–n to form an outbound ATM cell stream 42 transmitted over the ATM communication link 40.

The IMUXs 20 and 22 can be configured to use any number of the links 28a–n. Each of the DS1 data streams 30a–n on the links 28a–n, respectively, terminate at the receiver 26 of the IMUX 20 where the ATM cell stream 42 is reconstructed and sent over the ATM communication link 40. Likewise, the DS1 data streams 32a–n on the links 28a–n, respectively, each terminate at the receiver 36 of the IMUX 22, where an ATM cell stream 52 is reconstructed and sent on the ATM communication link 50.

In order for the ATM cell stream to be reconstructed, the ATM cells that are received at the receivers 26 and 36 from the links 28a–n must be multiplexed by the receivers 26 and 36 in the same order that the ATM cells were received at the transmitters 20 and 22 from the ATM communication links 40 and 50, respectively. Accordingly, a number of links from the links 28a–n must be selected, synchronized, and trained to operate at an optimal rate. Typically, the number of links that are selected from the links 28a–n depends on the data rate that the customer requests, the physical characteristics of each of the links 28a–n, and the number of available links. Based on these factors and other criteria, the optimal rate for each group of selected links 28 is selected.

In selecting the optimal transmission rate, various factors are considered, including the characteristics of each link 28. For example, if four links between IMUX 20 and 22 are selected, such as links 28a–d, to carry the inverse multiplexed ATM cell stream, then four links are trained at the optimal rate. Calculation of the selected optimal rate is subject of U.S. application Ser. No. 09/751,581 titled "Method and System for Establishing Link Bit Rate for Inverse Multiplexed Data Streams" on Dec. 29, 2000 and incorporated herein by reference.

The selected optimal rate for any given link will be the same as the selected optimal rate for all of the other links and will depend on the characteristics of the links. Thus, the selected optimal rate should not exceed the maximum transmission rate of any one of the links 28. Additionally, the selected optimal rate for each link may result in less than all of the available links being utilized.

Figure 2:
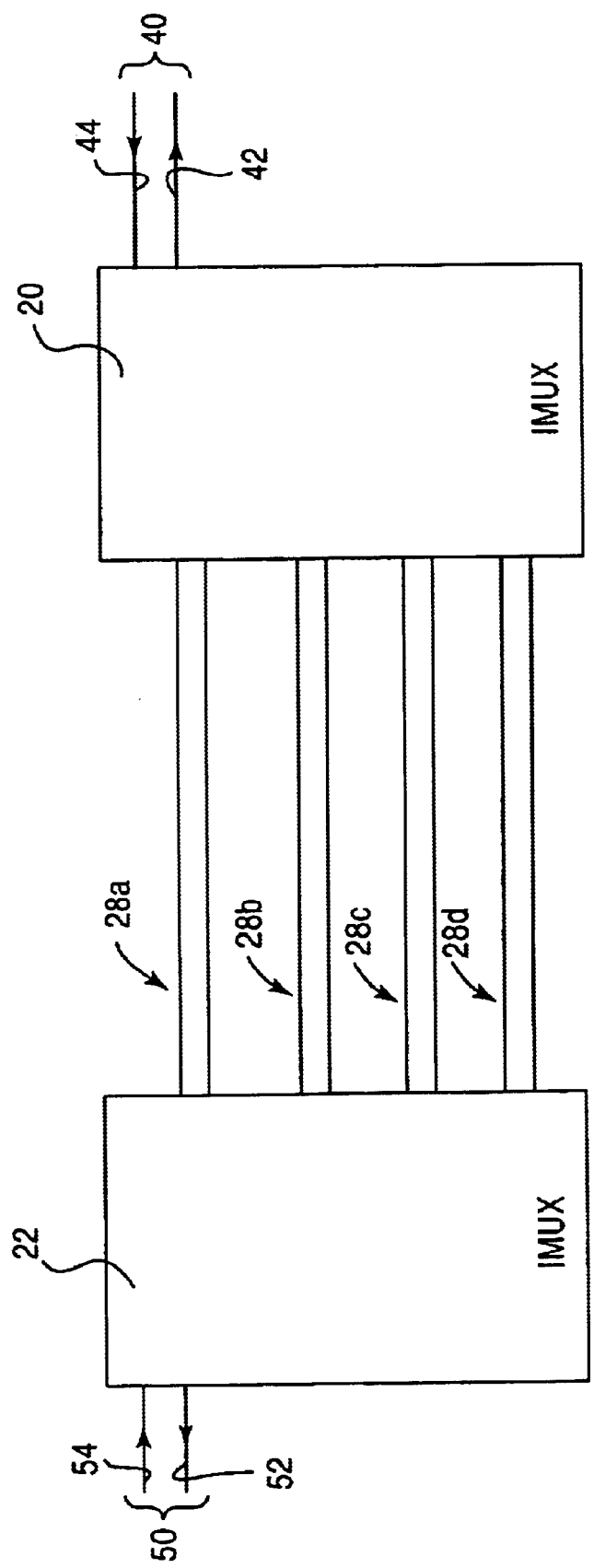
FIG. 2 is a block diagram of three active links and one idle link between the IMUXs of FIG. 1.

Referring now to FIG. 2, IMUXs 20 and 22 are shown, for illustration purposes, with four links 28a–d selected and available to carry the ATM cell streams 44 and 54 between the IMUX 20 and the IMUX 22. Although in this embodiment four links are shown, it will be apparent to those skilled in the art that any number of links can be used to carry ATM cell streams between the IMUX 20 and the IMUX 22. Furthermore, when specific numbers are used in the examples below, the intent is to illustrate various embodiments; it not intended to limit the scope and spirit of invention as claimed herein.

The data traffic is carried between the IMUXs 20 and 22 by the links 28a–d. In order to determine the optimal transmission rate for each link, the characteristics of each of the links are determined. It is the characteristics of the selected links 28a–d that will determine at what rate each of the lines will be trained and if all of the links 28a–d will be used.

For example, if the ATM cell stream rate requires a bandwidth or rate of 5.5 Mbps, and it is determined that each of the links 28a–d can carry a rate of 2 Mbps, then only three of the four links 28a–d are needed to carry the data between the IMUXs 20 and 22. Thus, three of the links, such as links 28a–c, are trained to operate at the 2 Mbps rate and carry the data as active links between the IMUXs 20 and 22.

In order to eliminated delays due to a link failure, the fourth available link, such as link 28d, is also trained to operate at the 2 Mbps rate, but acts as an idle link. Accordingly, if any one of the three active links 28a–c fails, then the idle link 28d can be used to immediately carry the traffic and, thereby, avoid the down time associated with having to retrain the failed links or add and train new links.

Figure 3:
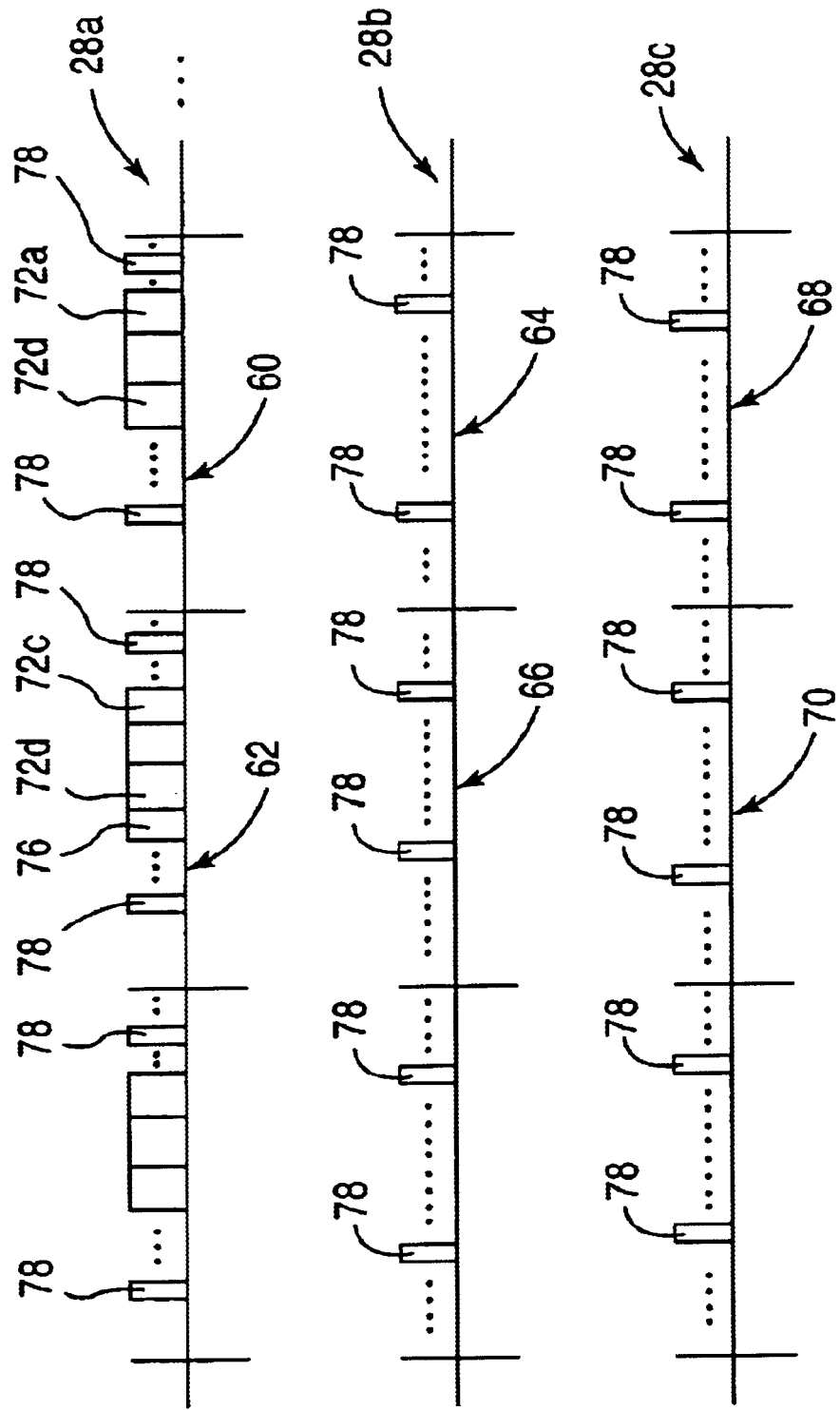
FIG. 3 is timeline illustration of an ATM cell stream inverse multiplexed onto three data links of FIG. 2.

Referring now to FIG. 3, the ATM data stream is shown after being inverse multiplexed onto a plurality of links 28a–c in frames 60, 62, 64, 66, 68, and 70. For clarity, only frames 60 and 62 on the link 28a are shown in detail even though the teachings set forth with respect to frame 60 or 62 apply to all other frames. The frames 60 and 62 can include ATM cells 72a–d some of which may be an idle ATM cell that was inserted when ATM cell were not available to be insert into the frame 60, cyclic redundancy check (CRC) cells 76, detection cells 78, and various other cells used for line detection and possible sequencing information, as will be discussed below.

The detection cell 78 can vary in length and frequency of insertion. For example the detection cell 78 may be eight byte or sixty-four bits in length and appear after ever eight ATM cells. Alternatively, the detection cell 78 may be four bytes in length and appear after every four ATM cells. The overhead resulting from inserting the detection cell 78 is about 8 bytes or 1% of the total payload per frame 60.

Regardless of the length of the detection cell 78 or the frequency of insertion, the detection cell 78 will contain a predetermined pattern that is known at the both ends of the link 28. Accordingly, error can be detected much faster and sooner because the detection cells, such as detection cell 78, are insert frequently and repeatedly into each frame with a known content. The detection cell 78 may also include sequencing information that can further be used to enhance error detection.

Figure 4:
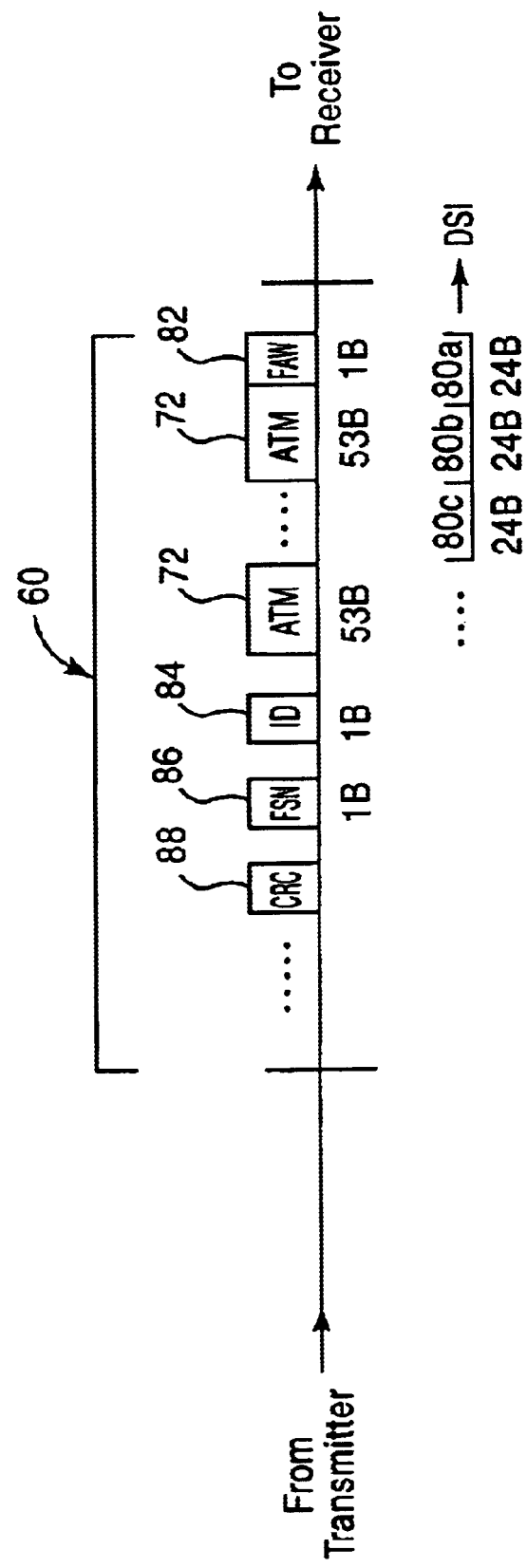
FIG. 4 is a timeline which shows the structure of an IMUX frame.

Referring to FIG. 4, a specific example of ATM cells are arranged on link 28a. The link 28a includes the DS1 data streams 30a. In this particular example, each frame, such as frame 60, is 438-byte long. The frames are carried in sequential 24-byte data payloads of DS1 frames 80a–n, which provide a 1.536 Mbps payload data rate. The frame 60 is not necessarily aligned with the DS1 frames 80; the first byte of the frame 60 does not necessarily begin at the first byte of a payload of the DS1 frame 80a.

Each frame carries eight ATM cells 72. Each ATM cell 72 is either an unmodified ATM cell that was received on inbound ATM cell stream 44 (or 54), or is an idle ATM cells inserted at the IMUX 20 or 22 because an ATM cells was not available to fill the frame 60. The first byte of the frame 60 is a frame alignment word (FAW) 82, that includes a 7-bit frame alignment word and a 1-bit far end block error (FEBE) indicator.

The frame 60 includes an ID byte 84, which includes a 2-bit line identifier, and a 1-bit "line active" indicator. The line identifier is an index, numbered from 0 for the first DS1 data stream, the DS1 data stream 30a in this example, to 3 for the fourth DS1 data stream, the DS1 data stream 30d in the example of FIG. 2. The line identifiers are used by the receiver to identify the order in which the receiver should assemble the ATM cells onto the outbound ATM cell stream, thereby avoiding reliance on proper physical identification of the physical communication lines carrying each of the DS1 data streams.

Additionally, the "line active" bit can be used by the receiver to determine whether an inactive line should be skipped altogether when reconstructing the ATM cell stream. Note that each the frame 60 includes four "overhead" bytes and 8*53=424 bytes of ATM cells, which amounts to less than 1% overhead per IMUX frame compared to the maximum DS1 payload data rate.

The content of each frame, in tabular form, is as follows:

TABLE 1

| | Frame structure | | |
| --- | --- | --- | --- |
| Frame byte number | Frame bit number | Number of bits | Description |
| 1 | 1–7 | 7 | Frame alignment word |
| 1 | 8 | 1 | Far end block error (FEBE) indicator |
| 2–54 | 9–432 | 424 | ATM cell 1 |
| 55–107 | 433–856 | 424 | ATM cell 2 |
| 108–160 | 857–1280 | 424 | ATM cell 3 |
| 161–213 | 1281–1703 | 424 | ATM cell 4 |
| 214–266 | 1704–2128 | 424 | ATM cell 5 |
| 267–319 | 2129–2552 | 424 | ATM cell 6 |
| 320–372 | 2553–2976 | 424 | ATM cell 7 |
| 373–425 | 2977–3400 | 424 | ATM cell 8 |
| 426 | 3401–3404 | 4 | Reserved |
| 426 | 3405 | 1 | Available under software control |
| 426 | 3406 | 1 | "Line active" indicator |
| 426 | 3407–3408 | 2 | Line identification |
| 427 | 3409–3416 | 8 | Frame sequence number (FSN) |

TABLE 1-continued

| | Frame structure | | |
| --- | --- | --- | --- |
| Frame byte number | Frame bit number | Number of bits | Description |
| 428 | 3417–3422 | 6 | Cyclic redundancy check (CRC-6) |
| 428 | 3423 | 1 | Remote alarm indication |
| 428 | 3424 | 1 | Reserved |

The cell sequence numbers of ATM cells 72 are determined from frame sequence number (FSN) 86, which is typically at byte 427 in the frame 60.

It is to be understood that the foregoing description is intended to illustrate and not limit the scope of the invention, which is defined by the scope of the appended claims. Other aspects, advantages, and modifications are within the scope of the following claims. Although described in the context of particular embodiments, it will be apparent to those skilled in the art that a number of modifications to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter.

What is claimed is:

1. A system for detection of error conditions when passing a cell stream at a particular transmission rate from a first location to a second location over multiple links, the system comprising:

a first unit at the first location coupled to one end of each of a plurality of low capacity data links for receiving the cell stream and inverse multiplexing the cell stream into frames that are transmitted over at least two data links trained to operate at optimal rates and selected from the plurality of low capacity data links that are set to active status; and a second unit at the second location coupled to the other end of each of the plurality of low capacity data links for receiving the frames from each of the active trained data links and multiplexing the frame to produce the cell stream, wherein the first unit inserts at least one detection cell containing a predetermined pattern that is known by both the first unit and the second unit into each frame prior to transmission and the second unit analyzes the received detection cell to determine if an error condition exits wherein the trained data links operate at an optimal rate, and the optimal rate is selected based on at least one of a data rate selected, physical characteristics of the low capacity data links, and a number of available links.

2. The system of claim 1 further comprising at least one data link selected from the plurality of low capacity data links that is trained and set to idle status, wherein the first unit and the second unit switch to use the trained idle data link to replace any one of the active trained data links that has failed and wherein the status of the idle data link is changed to active, thereby avoiding system down time due to line failure.

3. A method for enhancing error detection in a data stream transmitted from a first unit to a second unit, the method comprising:

establishing a desired cell size for a detection cell and a frequency of insertion into the data stream;

determining a known signal that will be part of the detection cell;

inserting the detection cell with the known signal into the data stream being transmitted from the first unit to the second unit; and analyzing the received detection cell at the second unit to determine if an error condition exists wherein the data stream is transmitted via trained data links operating at an optimal rate and wherein the optimal rate is selected based on at least one of a data rate selected, physical characteristics of the low capacity data links, and a number of available links.

* * * * *